United States Patent
Müller

[19]

[11] Patent Number: 5,924,755
[45] Date of Patent: Jul. 20, 1999

[54] ADJUSTING DEVICE IN A MOTOR VEHICLE

[75] Inventor: Jens-Olaf Müller, Leonberg, Germany

[73] Assignee: Robert Bosch GmbH, Stuttgart, Germany

[21] Appl. No.: 09/039,818

[22] Filed: Mar. 16, 1998

[30] Foreign Application Priority Data

Mar. 15, 1997 [DE] Germany ............... 197 10 836

[51] Int. Cl.⁶ .................................................. B60N 2/02
[52] U.S. Cl. ................... 296/65.01; 297/410; 297/391
[58] Field of Search ................ 296/65.01; 297/410, 297/359, 399, 400

[56] References Cited

U.S. PATENT DOCUMENTS

| | | | |
|---|---|---|---|
| 4,222,608 | 9/1980 | Maeda | 297/391 |
| 4,285,545 | 8/1981 | Protze | 296/65.01 |
| 4,645,233 | 2/1987 | Bruse et al. | 297/410 |
| 4,765,683 | 8/1988 | Hattori | 297/410 |
| 4,779,929 | 10/1988 | Küchemann | 297/410 |
| 4,935,680 | 6/1990 | Sugiyama | 297/410 |
| 5,171,062 | 12/1992 | Courtois | 297/410 |
| 5,222,784 | 6/1993 | Hamelin . | |
| 5,229,694 | 7/1993 | Takahara et al. . | |
| 5,812,399 | 9/1998 | Judic et al. | 296/65.01 |

FOREIGN PATENT DOCUMENTS

| | | |
|---|---|---|
| 32 40 294 | 5/1984 | Germany . |
| 34 27 466 | 1/1989 | Germany . |

*Primary Examiner*—Joseph D. Pape
*Assistant Examiner*—Kiran Patel
*Attorney, Agent, or Firm*—Kenyon & Kenyon

[57] ABSTRACT

An adjusting device in a motor vehicle includes an adjusting drive for a head restraint and a mirror whose position is determinable. The position of the mirror is fed to control electronics, and the position of a seat may also be fed to the control electronics. The adjusting drive is driven as a function of the position of the mirror.

6 Claims, 2 Drawing Sheets

ADJUSTING DEVICE IN A MOTOR VEHICLE

BACKGROUND INFORMATION

German Patent No. 32 40 294 describes a device for adjusting the height of a head restraint on a motor-vehicle seat. Arranged on the head restraint is a measuring device interacting with a switching device which drives the adjusting drive of the head restraint. This measuring device, formed, for example, as an infrared-reflecting light barrier, detects the height of the seat occupant at a specific location on the body. The support position of the head restraint is accommodated to the seat occupant as a function of the ascertained height. However, an additional measuring device is necessary for this purpose.

An object of the present invention is to reduce the expenditure for the automatic height adjustment of a head restraint.

SUMMARY OF THE INVENTION

The device of the present invention has an adjusting drive for a head restraint and a mirror, whose position is determinable. According to the present invention, the adjusting drive is driven as a function of the mirror position. Since the position of the mirror gives information about the size of the respective user, it is possible to dispense with an additional measuring device regarding this. Since in the case of most motor vehicles, particularly of the higher-end models, a motorized mirror adjustment is carried out, the motor position is available in any case as a measure for the position of the mirror. The automatic adjustment of the height of the head restraints to the size of the user increases his/her safety considerably, since the head restraints are no longer incorrectly adjusted. Troublesome, manual adjustments of the head restraints are eliminated.

In an embodiment of the present invention, the adjusting drive is driven as a function of a seat position. Since the seat position also gives information about the size of the respective user, the quality of the determined setpoint position of the head restraint can be further improved by this means. Incorrectly adjusted head restraints because of inaccurate size determination can be avoided.

In a further embodiment, the position of the mirror is fed via a bus system to control electronics. The position of the mirror can be queried via the bus without additional cabling expenditure. No additional hardware is necessary. The same holds true if the seat position is supplied via the bus system to the control electronics.

DETAILED DESCRIPTION

Figure 1:
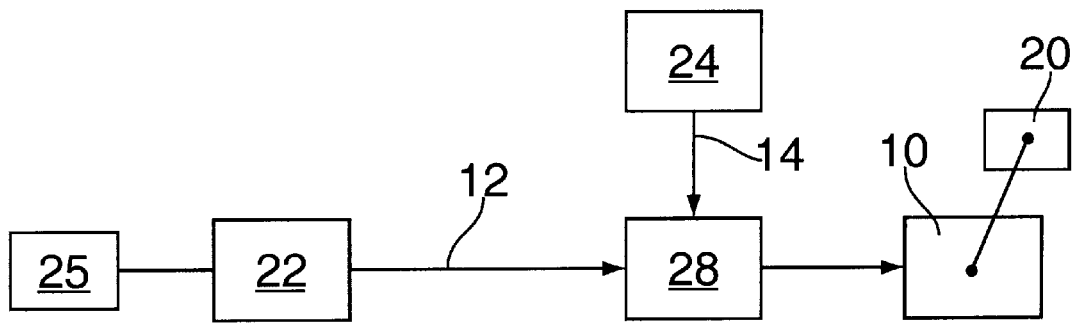
FIG. 1 shows a block diagram of a device of the present invention.
Figure 2:
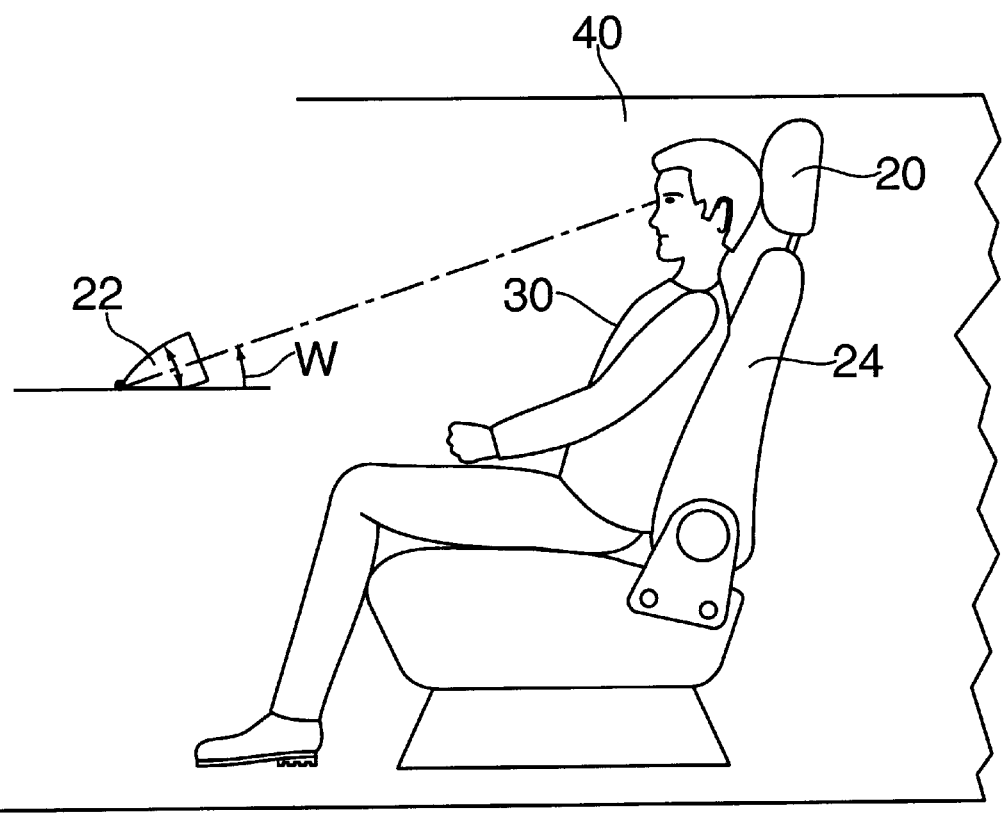
FIG. 2 shows a further exemplary embodiment.

According to FIG. 1, a position 12 of a mirror 22 is fed to control electronics 28. The same procedure is carried out with a seat position 14 of a seat 24. Control electronics 28 drives an adjusting drive 10 which moves a head restraint 20. As shown in FIG. 2, seat 24 has an occupant 30 in motor vehicle 40. Mirror 22 is appropriately adjusted to this occupant 30. Head restraint 20 is also at a height suitable for occupant 30. The projection of the normal of the mirror surface and the horizontal line form an angle W as a measure for position 12 of mirror 22.

The exemplary embodiments of the device according to the present invention shown in FIGS. 1 and 2 function as follows:

Described representatively here is the adjusting operation of head restraint 20 of driver's seat 24. Position 12 of mirror 22, the outside mirror on the driver's side, for example, is queried. If mirror 22 is actuated by adjusting drives 25, then their position is a measure for position 12 of mirror 22. Mirror 22 according to FIG. 2 can be moved about a point of rotation in the drawing plane. The position of the adjusting drive 25, which causes a movement of mirror 22 in this plane, serves as a measure for position 12. A large angle W arising between the horizontal line and the projection of the normal of the mirror surface in the drawing plane indicates a large occupant 30, and a small angle W indicates a small occupant 30.

For a simple implementation, only position 12 of mirror 22 is taken into consideration. The larger the described angle W, the higher head restraint 20 is moved by adjusting drive 10. Control electronics 28 specifies, as a function of position 12 corresponding to angle W, a corresponding position setpoint value for adjusting drive 10 which moves head restraint 20 accordingly.

Allocated to different positions 12 or position ranges of mirror 22 are corresponding position setpoint values of adjusting drive 10 of head restraint 20. Depending on the actually detected position 12, the position setpoint value allocated to position 12 is specified for adjusting drive 10.

For a more precise adjustment of head restraint 20, in addition to position 12 of mirror 22, seat position 14 is also taken into consideration. The further seat 24 is moved horizontally to the back, and the further head restraint 20 is moved upward. If seat 24 is inclined further to the back, a larger occupant 30 is inferred.

The position setpoint values of head restraint 20 are filed in parameter records as a function both of position 12 of mirror 22 and of seat position 14 of seat 24. In each case, these parameter records must take into account the vehicle-specific geometry data of the mounting of mirror 22 relative to seat 24. Position 12 of mirror 22 or seat position 14 can also be determined by conventional systems such as incremental position encoders.

The height of head restraint 20 can be adjusted automatically after actuating the ignition. It would also be conceivable, after a change in position 12 of mirror 22, to automatically readjust head restraint 20 in response to the position setpoint value then resulting for adjusting drive 10. Another alternative is to assign this automatic adjusting function of head restraint 20 to a special operating control element.

Figure 3:
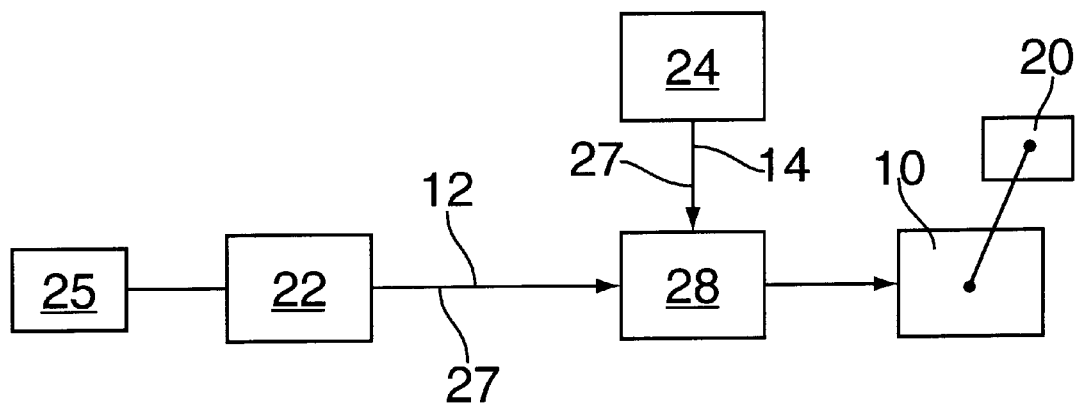
FIG. 3 shows a block diagram of a device according to another exemplary embodiment of the present invention.

In FIG. 3, if the adjustment of mirror 22 or seat 24 is driven by way of a bus system, both position 12 of mirror 22 and seat position 14 can be queried via this bus, control electronics 28 selecting a corresponding position setpoint value for head restraint 20 as a function of these positions.

The exemplary embodiment is not restricted to the use of an outside mirror; for example, it is also possible to fall back upon the inside mirror and its position 12.

What is claimed is:

1. An adjusting device of a motor vehicle, the motor vehicle having a head restraint and a mirror, the adjusting device comprising:

a mirror position detector for detecting a position of the mirror; and an adjusting drive coupled to the mirror position detector for adjusting the head restraint as a function of the detected position of the mirror.

2. The adjusting device according to claim 1, wherein the head restraint is adjusted as a further function of a seat position of a seat of the motor vehicle.

3. The adjusting device according to claim 1, wherein the mirror is an outside mirror of the motor vehicle.

4. The adjusting device according to claim 1, further comprising control electronics for driving the adjusting drive.

5. The adjusting device according to claim 4, further comprising a bus system for feeding the detected position of the mirror to the control electronics.

6. The adjusting device according to claim 5, wherein the bus system also feeds a seat position of a seat of the motor vehicle to the control electronics, the control electronics driving the adjusting drive as a function of the position of the mirror and of the seat position of the seat.

* * * * *